Patented Feb. 16, 1932

1,844,940

UNITED STATES PATENT OFFICE

KARL BALTHASAR, OF KLAGENFURT, AUSTRIA, ASSIGNOR OF UNDIVIDED FOUR-FIFTHS TO RICHARD KRAUSE, OF VIENNA, AND TO ADOLF ZINGL, CAMILLO DERFLINGER, AND JULIUS ORTIS, ALL OF KLAGENFURT, AUSTRIA

MANUFACTURE OF CEMENT

No Drawing. Application filed January 30, 1929, Serial No. 336,329, and in Austria April 4, 1928.

In the manufacture of Portland cement magnesia is considered as a substance which unfavourably affects the quality of the cement. Experience shows that an unfavourable effect is produced even with 3% magnesia, and at 5% the effect is so unfavourable that according to the standard regulations for Portland cement, a higher proportion of magnesia is declared to be inadmissible.

According to the present state of the art, it is impossible to counteract this injurious influence.

This drawback is felt where a cement mill has to work with magnesia-containing raw materials, and makes it extremely difficult for such mills to comply with the stringent conditions demanded from Portland cement of high initial setting strength. Very favourable raw materials cannot be used for the manufacture of Portland cement merely because they have an excessive proportion of magnesia. This fact is of particular importance when using blast furnace slag, as this waste product of metallurgical works can be very well used for the manufacture of Portland cement.

The present invention completely eliminates the injurious influence of magnesia and makes it possible to manufacture Portland cements of high initial setting strength which contain more than 12% magnesia. This is rendered possible owing to the fact that the causes of the injurious properties of magnesia have been discovered and eliminated by suitable steps.

The elimination of the injurious properties of magnesia is ensured substantially by a modified process of calcining.

The present cement technique distinguishes in the calcining of Portland cement only two stages of calcining:—the conversion of carbonate of lime into caustic lime at a temperature of 700 to 1200° C., and the fritting or sintering of the mass at a temperature of 1200–1450° C.

When calcining Portland cement containing magnesia, to these two stages of calcining is added a third one beyond 1450° C.

The introduction of this third stage of calcining is the result of the behaviour of magnesia during the calcining. At the temperature of 700 to 1400° C., magnesia has a stronger action on silicic acid than that of the caustic lime, and forms a magnesium silicate. The caustic lime is partly prevented by the magnesia from combining with the silicic acid, and this part remains free.

If the process of calcining is carried only to the second stage, a clinker will be obtained which disintegrates in the air in a short time. A cement made from such a clinker, has considerable expansion power.

If however the process of calcining is continued beyond the second stage, the mass undergoes a further chemical change.

The excess of caustic lime acts on the magnesium silicate, separates the magnesia and forms a calcium silicate. The duration of this stage of calcining depends on the proportion of the magnesia and on the nature of the raw material.

The clinker obtained, does not differ in any way from the clinker free from magnesia or poor in magnesia, and in the same way the cement fulfills the same conditions.

When blast furnace slag containing magnesia is used, the magnesium silicate will be present in the raw mass. The lime added can decompose the magnesium silicate only in the third calcining stage and form a calcium silicate.

The technical conditions required for the calcining of magnesia-containing Portland cement are as follows:

The proportion of lime must be as great as possible, and must correspond at least to a hydraulic modulus of 1.9. Fluctuations in the proportion of lime in the raw mass are admissible only up to one half per cent.

Only metallurgical coke may be used as fuel and it must be also used in a given percentage and uniformly distributed in the raw mass.

In order to ensure perfect uniformity in the proportion of lime and in the addition of fuel, the following process is used:—

The weighed raw material or the two components of the raw material, limestone on the one hand, and clay, marl or blast furnace slag, on the other hand, are brought in a finely ground state into a slurry vat and made into a thick slurry. When the thick slurry is perfectly homogeneous and has the correct chemical composition, a given quantity of coke in small pieces is added and uniformly distributed in the thick slurry by means of a mixer.

For the chemical control test of correct composition of the thick slurry, the following example may be given which refers to anhydrous raw mass:

$CaCO_3$ = 69.4% = 38.9% $CaO$ + 30.5% $CO_2$
$MgCO_3$ = 11.2% = 5.3% $MgO$ + 5.9% $CO_2$
$SiO_2$ = 12.3%
$R_2O_3$ = 7%
Alkalies = 0.1%

Total = 100

In this raw mixture the hydraulic modulus is $$\frac{CaO}{SiO_2 + R_2O_3} = \frac{38.9}{19.3} = 2.0.$$

Owing to the calcining, the carbonic acid is expelled, and the following composition is left for the cement: $CaO$ = 61.1, $MgO$ = 8.3, $SiO_2$ = 19.4, $R_2O_3$ = 11, alkalis 0.2, total 100.

The thick slurry mixed with coke is introduced into a drying drum and water is evaporated until the mass can be worked on a dry press. The bricks obtained are introduced into a shaft kiln and calcined.

The shaft kiln is worked with compressed air and the time of calcining is regulated by an intermittent stoppage of the air supply. It is advisable automatically to discharge the clinker from the kiln by means of a rotary grate.

When raw materials with varying proportions of magnesia are treated, it is necessary, when setting the thick slurry, to determine the proportion of lime and magnesia, in order to obtain the correct and constant modulus.

I claim:

A process for the manufacture of Portland cement, more particularly of Portland cement having high initial setting strength, from raw materials containing magnesia, such as for instance blast furnace slag, characterized by the raw materials which after the calcining yield a product with a proportion of over 5% magnesia, being finally calcined at a temperature of over 1450° C., and the said temperature of final calcining acting for at least 20 minutes on the fritted mass, so that it is possible to obtain from these raw materials Portland cements with a proportion of 5 to 15% magnesia.

In testimony whereof I affix my signature.

Dr. KARL BALTHASAR.